US010817456B2

(12) United States Patent
Feehrer et al.

(10) Patent No.: US 10,817,456 B2
(45) Date of Patent: Oct. 27, 2020

(54) SEPARATION OF CONTROL AND DATA PLANE FUNCTIONS IN SOC VIRTUALIZED I/O DEVICE

(71) Applicant: Oracle International Corporation, Redwood City, CA (US)

(72) Inventors: John R. Feehrer, Westford, MA (US); Matthew Cohen, Cambridge, MA (US); Rahoul Puri, Los Altos, CA (US); Tayfun Kocaoglu, Los Gatos, CA (US); John Johnson, San Jose, CA (US); David Kahn, Makawao, HI (US); Alan Adamson, San Diego, CA (US); Sriram Jayakumar, Lexington, MA (US); Julia Harper, Arlington, MA (US); Robert G. Sheldon, Duxbury, MA (US); Mark Kanda, Austin, TX (US); Aruna Jayakumar, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 68 days.

(21) Appl. No.: 15/629,293

(22) Filed: Jun. 21, 2017

(65) Prior Publication Data

US 2017/0286354 A1 Oct. 5, 2017

Related U.S. Application Data

(63) Continuation-in-part of application No. 14/944,835, filed on Nov. 18, 2015.

(51) Int. Cl.
*G06F 13/36* (2006.01)
*G06F 13/42* (2006.01)
*G06F 9/455* (2018.01)

(52) U.S. Cl.
CPC ...... *G06F 13/4282* (2013.01); *G06F 9/45545* (2013.01); *G06F 13/36* (2013.01); *G06F 2213/0026* (2013.01)

(58) Field of Classification Search
CPC .. G06F 13/4282; G06F 9/45545; G06F 13/36; G06F 2213/0026
See application file for complete search history.

(56) References Cited

U.S. PATENT DOCUMENTS 8,351,442 B1 * 1/2013 McGlaughlin ........ G06F 13/128
370/229
8,964,601 B2 2/2015 Kamath
(Continued)

OTHER PUBLICATIONS

Abraham Silberschatz, et al, Operating System Concepts, Third Edition, book, Reprinted Sep. 1991, pp. 96-97, 601-602, Addison-Wesley Publishing Company, published U.S.

*Primary Examiner* — Tim T Vo
*Assistant Examiner* — Harry Z Wang
(74) *Attorney, Agent, or Firm* — Kowert, Hood, Munyon, Rankin & Goetzel, P.C.

(57) ABSTRACT

An apparatus and method for controlling a device with shared hardware resources to provide separate execution environments for control and data functions are disclosed. A processor may be configured to generate a first request to access control functions of the device in response to execution of a first thread, and generate a second request to access data functions of the device in response to execution of a second thread. A communication unit may send first indicative of the first request and second data indicative of the second request to the device via first and second ports, respectively.

16 Claims, 8 Drawing Sheets

(56) References Cited

U.S. PATENT DOCUMENTS

| | | | |
|---|---|---|---|
| 2005/0198601 A1* | 9/2005 | Kuang | G06F 17/5022 |
| | | | 716/108 |
| 2009/0113430 A1* | 4/2009 | Riley | G06F 9/468 |
| | | | 718/101 |
| 2013/0151750 A1* | 6/2013 | Kanigicherla | G06F 13/4022 |
| | | | 710/313 |
| 2013/0195113 A1 | 8/2013 | Kotha | |
| 2014/0201303 A1 | 7/2014 | Dalal | |
| 2015/0163524 A1* | 6/2015 | Hamzeh | H04W 4/18 |
| | | | 725/116 |
| 2016/0098365 A1* | 4/2016 | Bshara | G06F 13/105 |
| | | | 710/104 |

* cited by examiner

SEPARATION OF CONTROL AND DATA PLANE FUNCTIONS IN SOC VIRTUALIZED I/O DEVICE

PRIORITY INFORMATION

This application is a continuation-in-part of U.S. patent application Ser. No. 14/944,835, entitled "SEPARATION OF CONTROL AND DATA PLANE FUNCTIONS IN SOC VIRTUALIZED I/O DEVICE," filed Nov. 18, 2015, which is hereby incorporated by reference in its entirety as though fully and completely set forth herein.

BACKGROUND

Technical Field

This invention relates to computing systems, and more particularly, to techniques for managing control and data functions in a device.

Description of the Related Art

Computing systems include multiple multi-threaded processors and devices, where each processor may send data to or receive data from a particular device. For example, the devices may include Ethernet network interface cards (NICs) that allow the processors to communicate with other computing systems, and other devices either internal or external to the computing system such as printers or storage devices, for example.

Hardware resources (or simply "resources") associated with a particular device may be shared between various threads being executed by one or more of the multi-threaded processors. During operation, a given thread may execute one or more software instructions that request access, either a read or write, to a particular hardware resource of a given device. The computing system may format and transmit the access request to the particular hardware resource via a packetized serial communication link.

To manage access requests from the various threads, a device may include dedicated hardware to perform control and data functions within the device. In some cases, the dedicated hardware may include an embedded processor, or other suitable general-purpose processor, configured to execute multiple software instructions. In some computing systems, a device with shared hardware resources may be integrated into a System-on-a-Chip (SoC) along with one or more multi-threaded processors, for improved performance.

SUMMARY OF THE EMBODIMENTS

Various embodiments of an apparatus and method for handling interrupts in a computing system are disclosed. Broadly speaking, a method and apparatus are contemplated in which a processor is configured to, in response to execution of a first thread, generate a first request to access one or more control functions of a device that includes shared hardware resources. The processor may be further configured to generate a second request to access one or more data functions of the device in response to execution of a second thread. A communication unit may send first data indicative of the first request to the device via a first port on the device, and send second data indicative of the second request to the device via a second port on the device.

In a non-limiting embodiment, the device may be further configured to access a communication link based on the one or more control function and the one or more data functions.

In one implementation, the device may be further configured to communicate one or more capabilities to the process during an initialization procedure.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Multi-processor computing systems may support the use of one or more virtual machines, each running a respective Guest Operating System (GOS). Hardware resources, such as, e.g., an Input/Output (I/O) subsystem, may be shared between the various GOSs. During operation of such multi-processor computing systems, there may be many requests generated by software programs executing within the GOSs to transfer data to, or retrieve data from, peripheral storage devices or other computing systems.

I/O subsystems may include multiple hardware ports (or simply "ports") coupled to a common communication hub. For example, some systems may employ multiple PCI-Express Root Ports coupled to a common Root Complex. Each Root Port may handle data transfers with a device. In some cases, the hardware resources of the device may be shared among different threads being executed by a processor or among multiple GOSs. Each of the shared hardware resources appear as a dedicated resource to the different GOSs and threads sharing the hardware resources. A device whose hardware resources are shared in this manner is commonly referred to as a "virtualized device."

Arbitration, metering, and monitoring of access to the hardware resources of a device among the various GOSs and threads is managed by control plane functions associated with the device. To implement such control functions, an embedded processor included in the device may execute firmware loaded into the device during initialization of the computing system. When a virtualized device is integrated into a System-on-a-chip (SoC), the embedded processor adds extra area, power consumption, and increases test complexity for the SoC. The embodiments illustrated in the drawings and described below may provide techniques for separating control and data functions in a virtualized device integrated into a SoC to reduce complexity of the virtualized device by simplifying circuitry dedicated to the control plane functions.

Figure 1:
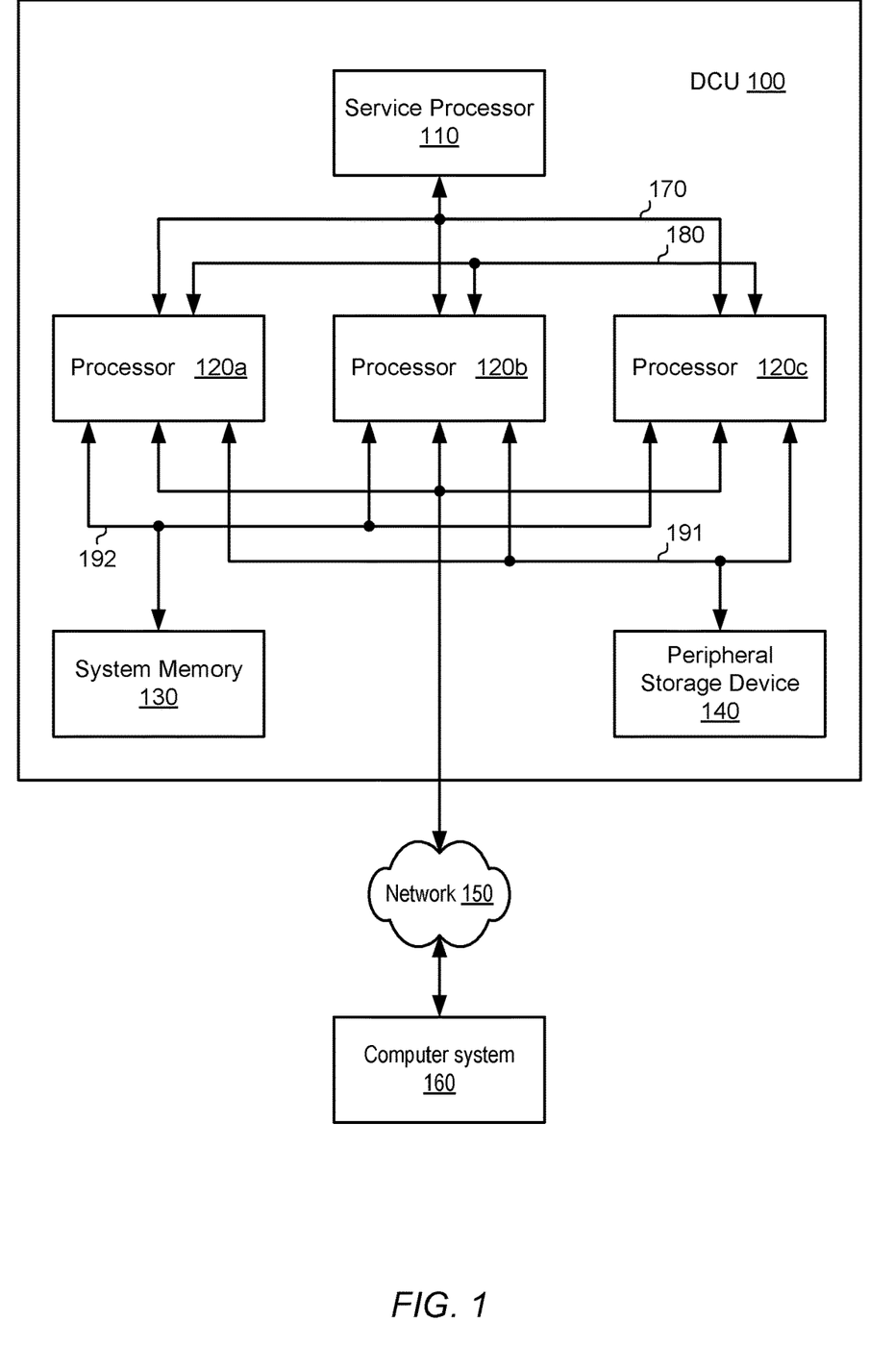
FIG. 1 is a block diagram of an embodiment of a distributed computing system.

A block diagram illustrating one embodiment of a distributed computing unit (DCU) 100 is shown in FIG. 1. In the illustrated embodiment, DCU 100 includes a service processor 110, coupled to a plurality of processors 120a-c through bus 170. It is noted that in some embodiments, service processor 110 may additionally be coupled to system memory 130 through bus 170, and may coordinate initialization and boot of processors 120a-c, such as from a power-on reset. Processors 120a-c are, in turn, coupled to system memory 130, and peripheral storage device 140. Processors 120a-c are further coupled to each other through bus 180 (also referred to herein as "coherent interconnect 180"). DCU 100 is coupled to a network 150, which is, in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), Rambus® DRAM (RDRAM®), or non-volatile memory technology (e.g., NVDIMM-P/N), for example. It is noted that although one system memory is shown, in various embodiments, any suitable number of system memories may be employed. Each of processors 120a-c is coupled to system memory 130 via bus 192.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120a-c via bus 191, which may implement a particular communication protocol, such as, a standard Small Computer System Interface (SCSI), a Fiber Channel interface, a Firewire® (IEEE 1394) interface, Peripheral Component Interface Express (PCIe), or another suitable interface. Additionally, it is contemplated that in other embodiments, any other suitable peripheral devices may be coupled to processors 120a-c, such as multi-media devices, graphics/display devices, standard input/output devices, etc.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor.

The use of virtualized devices in a computing system, such as, e.g., DCU 100, may allow multiple guest operating system (GOS) instances to share hardware such that individual GOS instances are protected and isolated from each other. Through isolation of individual GOS instances, efficient use of a computing system's virtualized resources may be realized, while keeping the GOS instances from interfering with each other. For example, a fatal error or performance bottleneck in one GOS instance should not disrupt the operation of other GOS instances. The use of virtualization may, in various embodiments, allow for a lower cost of a computing system. For example, a datacenter may employ a single virtualized system as opposed to purchasing multiple servers, thereby lowering the overall cost of the computing system.

In particular, I/O subsystems, i.e., collections of circuit blocks configured to perform communication tasks with devices may also be virtualized, thereby allowing I/O devices such as a NIC or disk controller to be shared by multiple GOS instances. In order to virtualize an I/O device, the I/O device interrupts must be able to communicate with each GOS sharing the resources of the particular I/O device. As will be described below in more detail, certain protocols may be employed to allow inband access to both control and data plane functions of a virtualized I/O device.

The embodiment of the computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor.

Figure 2:
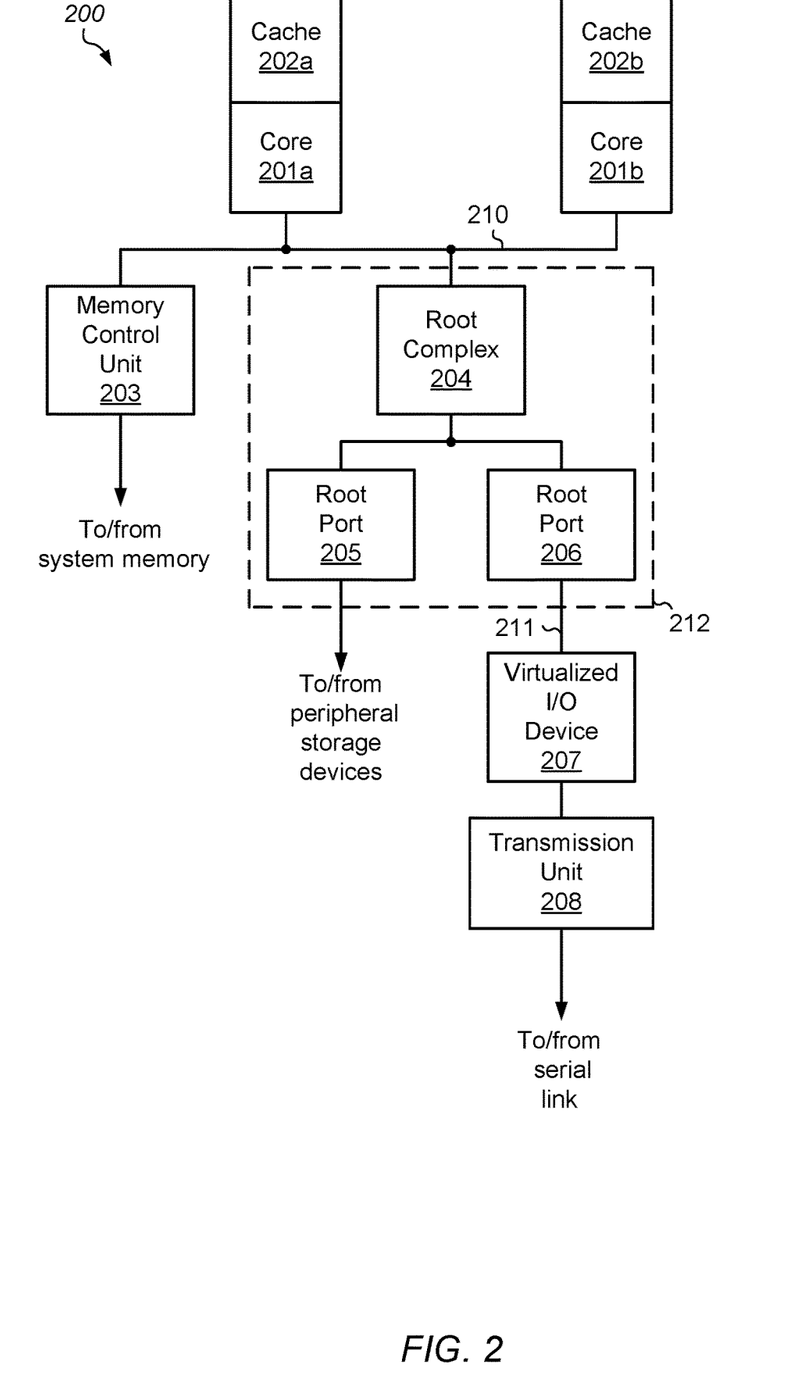
FIG. 2 is a block diagram of an embodiment of a system-on-a-chip (SoC) implemented on integrated circuit and including a communication unit.

A block diagram illustrating one embodiment of a SoC processor 200 is shown in FIG. 2. In some embodiments, processor 200 may correspond to processors 120a-c of DCU 100 in FIG. 1. In the illustrated embodiment, processor 200 includes processor cores 201a and 201b. It is noted that although two cores are shown, in various embodiments, any suitable number of processor cores may be employed. Each of cores 201a-b is coupled to a respective one of cache partitions 202a-b. Cores 201a-b are coupled to each other and to memory control unit 203, and communication unit 212 via on-chip network 210. On-chip network 210 may be a point-to-point network, ring-based network, or any other suitable network configuration that allows for communication between processor cores 201a-b, memory control unit 203 and communication unit 212. In some embodiments, on-chip network 210 may include a multi-wire parallel bus, and requests and responses between the various devices may be transmitted via the multi-wire parallel bus using an suitable communication protocol.

Cores 201 *a-b* may be configured to execute instructions and to process data according to a particular instruction set architecture (ISA). In one embodiment, cores 201*a-b* may be configured to implement the SPARC® V9 ISA, although in other embodiments it is contemplated that any desired ISA may be employed, such as x86, ARM, PowerPC® or MIPS®, for example. In the illustrated embodiment, each of cores 201*a-b* may be configured to operate independently of the others, such that all cores 201*a-b* may execute in parallel. Additionally, in some embodiments each of cores 201*a-b* may be configured to execute multiple hardware execution threads (or simply "threads") concurrently, where a given thread may include a set of instructions that may execute independently of instructions from another thread. (For example, an individual software process, such as an application, may have its tasks distributed over one or more threads by an operating system.) A core capable of executing multiple execution threads may be referred to as a multi-threaded (MT) core.

Cache memory partitions 202*a-b* may, in various embodiments, collectively form a level 3 (L3) cache memory for processor 200. The multiple cache memory partitions need to maintain coherency with respect to each other. Cache memory partitions 202*a-h* may, in various embodiments, implement one of numerous coherency protocols, such as, e.g., MOESI, MESI, or any suitable cache coherency protocol.

Each of cache memory partitions 202*a-b* may be configured to cache instructions and data for use by cores 201*a-b*. In the illustrated embodiment, each of cache memory partitions 202*a-b* may be separately addressable and independently accessed, may concurrently return data to a respective core of cores 201*a-b*. In some embodiments, each individual cache memory partition may be implemented using set-associative or direct-mapped techniques. For example, in one embodiment, each of cache memory partitions 202*a-h* may be an 8 megabyte (MB) cache, although other cache sizes and organizations are possible and contemplated.

Memory control nit 203 may be configured to manage the transfer of data between cache partitions 202*a-b* and system memory in response to fill requests and data evictions. Memory control unit 203 may be configured to interface to any suitable type of system memory, such as described above in reference to FIG. 1 In some embodiments, memory control unit 203 may be configured to support interfacing to multiple different types of system memory.

Communication unit 212 includes a PCIe Root Complex 204 and Root Ports 205 and 206, and may be configured to transfer data between processor 200 and other devices. It is noted that although a single Root Complex and two Root Ports are shown in the present embodiment, other embodiments may include any suitable number of Root Complexes and Ports. PCIe Root Complex 204 may, in various embodiments, be configured to relay requests and responses (collectively "transactions") between processor 200 and devices coupled to Root Ports 205 and 206. Since transactions may be formatted differently on the on-chip network 210 than what the aforementioned devices are capable of receiving, PCIe Root Complex 204 may translate the transactions from the communication protocol of on-chip network 210 to a communication protocol compatible with a device coupled to one of Root Ports 205 and 206. The translation of a transaction may include the translation of an address from the address space of processor 200 to a device address space, as well as the conversion of multi-bit data words into data packets to be transmitted in a serial fashion. It is noted that in the present embodiment, communication unit 212 includes circuit blocks specific to the PCIe communication protocol as a particular example to aid in explanation. In other embodiments, any suitable communication protocol may be employed, such as, Peripheral Component Interface (PCI) and Accelerated Graphics Port (AGP), for example.

Each of Root Ports 205 and 206 may be configured to relay a translated transaction to a particular device in accordance with a particular communication protocol. In some embodiments, Root Port 205 may be configured to relay a translated transaction to a device. In various embodiments, Root Port 205 may transmit the translated transaction to the device using one of various communication protocols, such as the PCIe communication protocol, for example. Such transactions may be sent outside of integrated circuit chip that includes processor 200.

Root Port 206 is coupled to virtualized device 207 via virtual link 211. As described below in more detail, virtualized device 207 may include circuitry configured to perform multiple functions, each of which may be accessed by separate Guest Operation Systems (GOS) being executed by processor 200, thereby allowing the hardware resources of virtualized device 207 to be shared among multiple software processes. Transactions relayed to virtualized device 207 via virtual link 211 may be encoded in accordance with any suitable protocol. In various embodiments, virtualized device 207, along with cores 201*a-b*, cache partitions 202*a-b*, memory control unit 203, Root Complex 204, root ports 205 and 206, and virtualized device 207 may be fabricated on the same integrated circuit chip 213. In such cases, virtual link 211 may not be limited by pin count, and may employ a multi-bit (parallel) data bus for improved communication speed and reliability.

Virtualized device 207 is further coupled to transmission unit 208. In various embodiments, transmission unit 208 may implement one or more network adaptor functions allowing virtualized device 207 access to an external device via a high-speed serial data link. For example, the transmission unit 208 may implement Ethernet, InfiniBand, or other suitable communication protocol.

It is noted that the embodiment illustrated in FIG. 2 is merely an example. In other embodiments, different devices, different numbers of cores, caches and devices, and different configurations of cores, caches, and devices are possible and contemplated.

As mentioned above, hardware resources of a virtualized device may be shared between different threads or GOSs. Each thread or GOS sharing the hardware resources of the virtualized device may accesses different "virtual" functions sharing the hardware resources of the virtualized device. To perform the actual transfer of data into and out of the virtualized device on behalf of the virtual function, the hardware resources of the virtualized device may implement multiple physical functions. A physical function, for example, may implement the control and status registers and logic functions for managing the link and physical layers of a networking or communication protocol.

To manage the sharing of the hardware resources, additional circuitry may implement additional functions (commonly referred to as "conventional functions") that manage access to the hardware resources by allowing the reading and writing of control registers within the virtualized device. Tasks included in the conventional function may be isolated from the physical and virtual functions so that user code and device drivers that access the physical and virtual function are incapable of accessing or interfering with the more global control tasks that apply to all physical and virtual functions. This separation of function may, in various embodiments, provide security for a virtualized system.

Figure 3:
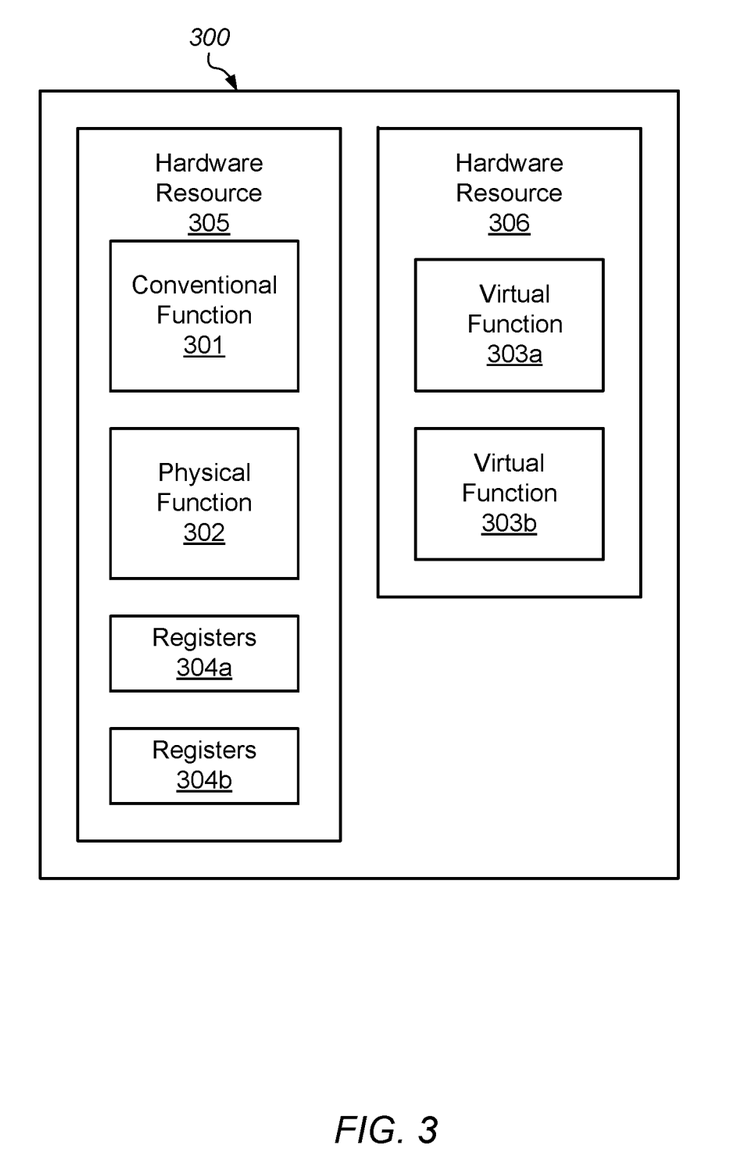
FIG. 3 is a block diagram of an embodiment of a virtualized device.

An embodiment of a virtualized device that is configured to implement multiple virtual functions is illustrated in FIG. 3. In various embodiments, virtualized device 300 may correspond to virtualized device 207 as illustrated in FIG. 2. In the illustrated embodiment, virtualized device 300 includes hardware resources 305 and 306. Hardware resource 305 may be configured to implement conventional function 301, and physical function 302. Additionally, hardware resource 305 includes registers 304a and 304b. Hardware resource 306 may be configured to implement virtual functions 303a-b, each of which may be mapped to separate GOSs or threads. In some embodiments, values stored in registers 304a and 304b may affect the operation of virtual functions 303a and 303b, respectively.

Hardware resources 305 and 306 may be implemented according to one of various design styles. For example, hardware resources 305 and 306 may be implemented using a dedicated sequential logic circuit or state machine. Alternatively, a general-purpose processor configured to execute software instructions may be used to implement either of hardware resources 305 and 306. Although two hardware resources are depicted in the embodiment illustrated in FIG. 3, it is noted that, in some embodiments, any suitable number of hardware resources, including a single hardware resources, may be employed in a virtualized device.

In order to implement the tasks included in conventional function 301, hardware resource 305 may include an interface that allows access to control plane management functions within virtualized device 300. Such control plane functions include, without limitation, connections to on-chip networks, communication with a fabric manager, I/O link configuration and training, communication channel establishment, performance monitoring and tuning, and general housekeeping functions. It is noted that, in some embodiments, hardware resource 305 may only include basic circuitry, such as, e.g., control registers and status registers collectively known as control status registers or CSRs (not shown), and that execution of commands associated with the control plane functions may be performed by a particular execution thread running on a processor or processor core, such as core 201a, for example.

By handling the control plane tasks of virtualized device 300 using an execution thread running on a processor core, hardware resource 305 may be simplified. Alternatively, or additionally, all communication, i.e., both control and data plane communication, to virtualized device 300 may be performed inband using existing communication capabilities thereby reducing a need for separate communication busses among the circuit blocks within an SoC. With reduced hardware and communication busses, pre-silicon verification and testing of the SoC may, in some embodiments, be simplified.

The execution of physical function 302 and virtual functions 303a-b, by hardware resources 305 and 306, collectively manage the transfer of data into and out of virtualized device 300 (commonly referred to as data plane functions). Such data plane functions may, in various embodiments, include management of user payload data stored in user-accessible queues, encapsulation of such data into packets for transmission via an I/O link, and generation of interrupts to communication events (e.g., completion of packet transmission, receipt of a particular message on the link, etc.), and errors, such as, malformed packets, CRC errors, invalid requests, and the like.

The data plane functions are accessed via software instructions running as part of an execution thread on a given processor or processor core. In various embodiments, the software instructions may be part of driver software (commonly referred to as a "device driver") for virtualized device 300. Physical function 302 and each of the virtual functions 303a-b may be mapped to a particular range of addresses within the address space of a computing system. The address range claimed by a particular virtual function may be set in a corresponding register. For example, the address range claimed by virtual function 303a may be programmed into registers 304a (also referred to herein as a "Base Address Register" or "BAR") during initialization. The distinction between physical function 302 and virtual functions 303a-b is made because certain operations performed in the virtualized device, such as, e.g., reporting I/O link errors or managing transaction-processing resources shared by all virtual functions, are executed by a version or operating instance of the device driver that comprehends all of the virtual functions. This version of the driver may manipulate resources for these tasks through physical function 302.

When software needs access to a particular physical or virtual function, such as, e.g., virtual functions 303a-b, Programmed I/O (P/O) read or write transactions may be issued via the executing thread. As described below in more detail, a software layer existing between the hardware a particular GOS instance may prevent unauthorized access to a particular function. Access to the CSRs may also be limited for security reasons.

It is noted that the embodiment illustrated in FIG. 3 is merely an example. In other embodiments, different numbers of virtual functions, and different control mechanisms may be employed.

Figure 4:
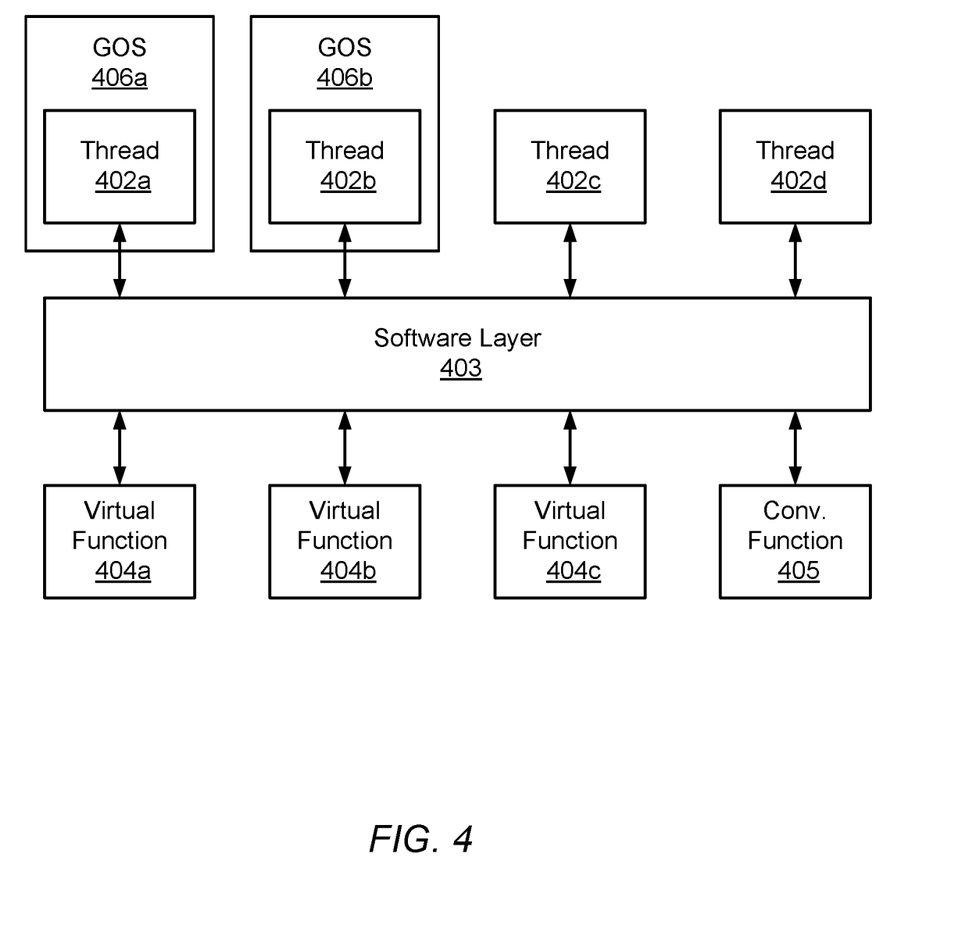
FIG. 4 is a block diagram illustrating control of a virtualized device.

Turning to FIG. 4, a block diagram illustrating control of a virtualized device is depicted. In the illustrated embodiment, execution threads 402a-d communication with software layer 403. In turn, software layer 403 communicates with virtual functions 404a-c and conventional function 405. In various embodiments, virtual functions 404a-c and conventional function 405 may be included in the functionality of a virtualized device, such as virtualized device 300 as illustrated in FIG. 3, for example.

Software layer 403 may, in various embodiments, map access requests from thread 402a to virtual function 404a. In a similar fashion, access requests associated with thread 402b may be mapped to virtual function 404b, and thread 402c may be mapped to virtual function 404c. Additionally, thread 402d may be mapped to conventional function 405. During the mapping process, software layer 403 (also referred to herein as a "Hypervisor layer") may enforce security protocols. For example, software layer 403 may block access to CSRs included within the virtualized devices.

Each of threads 402a, 402b, and 402c, may access data plane functions included with virtual functions 404a-c, respectively. In some embodiments, the data plane functions may include the managements of access to the hardware resources associated with the virtualized device, such as, e.g., hardware resources 305 and 306, in order to send or receive user payload data. For example, the data plane functions may be used to encapsulate user payload data into packets for transmission via an I/O link through a transmission unit, such as transmission unit 208 as depicted in FIG. 2

In some embodiments, thread 402d may manage control plane functions included within the virtualized device. Such control plane functions may include managing communication with a fabric manager, I/O link configuration and training, communication channel establishment, performance monitoring and tuning, and general housekeeping functions that apply to multiple functions, both physical and virtual. By employing an execution thread running on a processor core to handle these general housekeeping tasks, circuitry included in the virtualized device may be simplified, which results in a shorter hardware design and verification cycle, as well as a smaller and less expensive chip.

Execution thread 402a is utilized by GOS 406a, and execution thread 402b is utilized GOS 406b. Since each of execution threads 402a and 402b are employed by different GOS instances, the hardware resources associated with the virtualized device are effectively shared between the two GOS instances. It is noted that although only two threads included in two respective GOS are depicted in the embodiment illustrated in FIG. 4, in other embodiments, any suitable number of execution threads and GOS instances may be employed.

Figure 5:
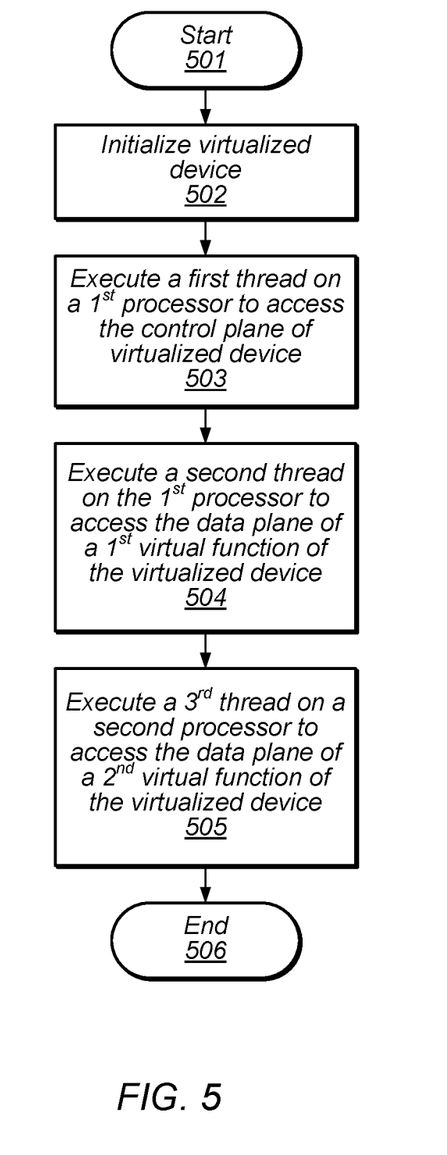
FIG. 5 illustrates a flow diagram depicting the operation of a virtualized device.

Turning to FIG. 5, a flow diagram depicting an embodiment of a method for operating a virtualized device is illustrated. The method begins in block 501. The virtualized device, such as, e.g., virtualized device 207 as illustrated in FIG. 2, may then be initialized (block 502). In some embodiments, during a boot procedure performed by a computing system, CSRs or other registers included in a virtualized device of the computing system may be programmed with predetermined values. The predetermined values may, in some embodiments, correspond to address locations or ranges mapped to an I/O subsystem of the computing system. The virtualized device may be fabricated as part an integrated circuit that includes multiple multi-thread processor cores as well as other circuit blocks, collectively forming an SoC.

A first thread may then be executed on a first processor to access control plane functions of the virtualized device (block 503). In some embodiments, the control plane functions may include managing communication with a fabric manager, I/O link configuration and training, communication channel establishment with a remote computer, performance monitoring and tuning, and general housekeeping functions. CSRs may be written to or read from as part of performing the control plane functions.

A second thread may then be executed on the first processor to access data plane functions associated with a physical function or a first virtual function of the virtualized device (block 504). In various embodiments, the data plane functions may include the management of access to the hardware resources of virtualized device in order to facilitate movement of user payload data. The user payload data may be encapsulated into packets for transmission via an I/O link through a transmission unit, such as transmission unit 208 as illustrated in FIG. 2, for example. It is noted that, in some embodiments, the second thread may include instructions that are included in a device driver for the virtualized device. It is further noted that in some embodiments, the second thread may be executed on a processor or processor core that is different from the processor or processor core executing the first execution thread.

A third thread may be executed on a second processor, different from the first processor, to access the data plane functions associated with a second virtual function (block 505). In some embodiments, the third thread may be executed as part of a GOS or other virtual machine running with the computing system. By allowing access to the virtualized device by an execution thread running as part of a GOS, the hardware resources of the virtualized device may be shared amongst multiple GOSs. The method may conclude in block 506. It is noted that the aforementioned mapping of thread to virtual functions may be extended beyond two, thereby allowing for additional thread and virtual functions, up to a number of threads supported in the computing system, and/or a number of virtual functions implemented in the device.

Although the operations of the method illustrated in FIG. 5 are depicted as being performed in a sequential fashion, in other embodiments, one or more of the depicted operations may be performed in parallel.

As described about, different execution threads may be used to manage the access to control and data plane functions within a virtualized device. For example, one thread may include instructions that handle communication channel establishment, performance monitoring and tuning, and the like, while another thread may include instructions that handle movement of user payload data. To accomplish this, a burden may be placed on the Hypervisor software layer to perform additional checks on accesses to I/O resources. For example, the Hypervisor may check accesses from device driver software to ensure registers in the virtualized device dedicated to control functions are not accessed. Moreover, the software for the control and data plane functions should be developed together to ensure proper functionality. Such development, however, can extend development time for different operating systems images as well as provide isolation between hardware management routines and device drivers interacting with user applications.

In the description that follows, embodiments are presented that include the use of additional root ports in a communication unit that are dedicated for control plane functions. The use of such a dedicated port may reduce complexity of the Hypervisor software layer, which may enforce separation between control plane and data plane functions, thereby speeding up development and release of software, as well as providing increased security through the separation of the control plane and data plane functions.

Figure 6:
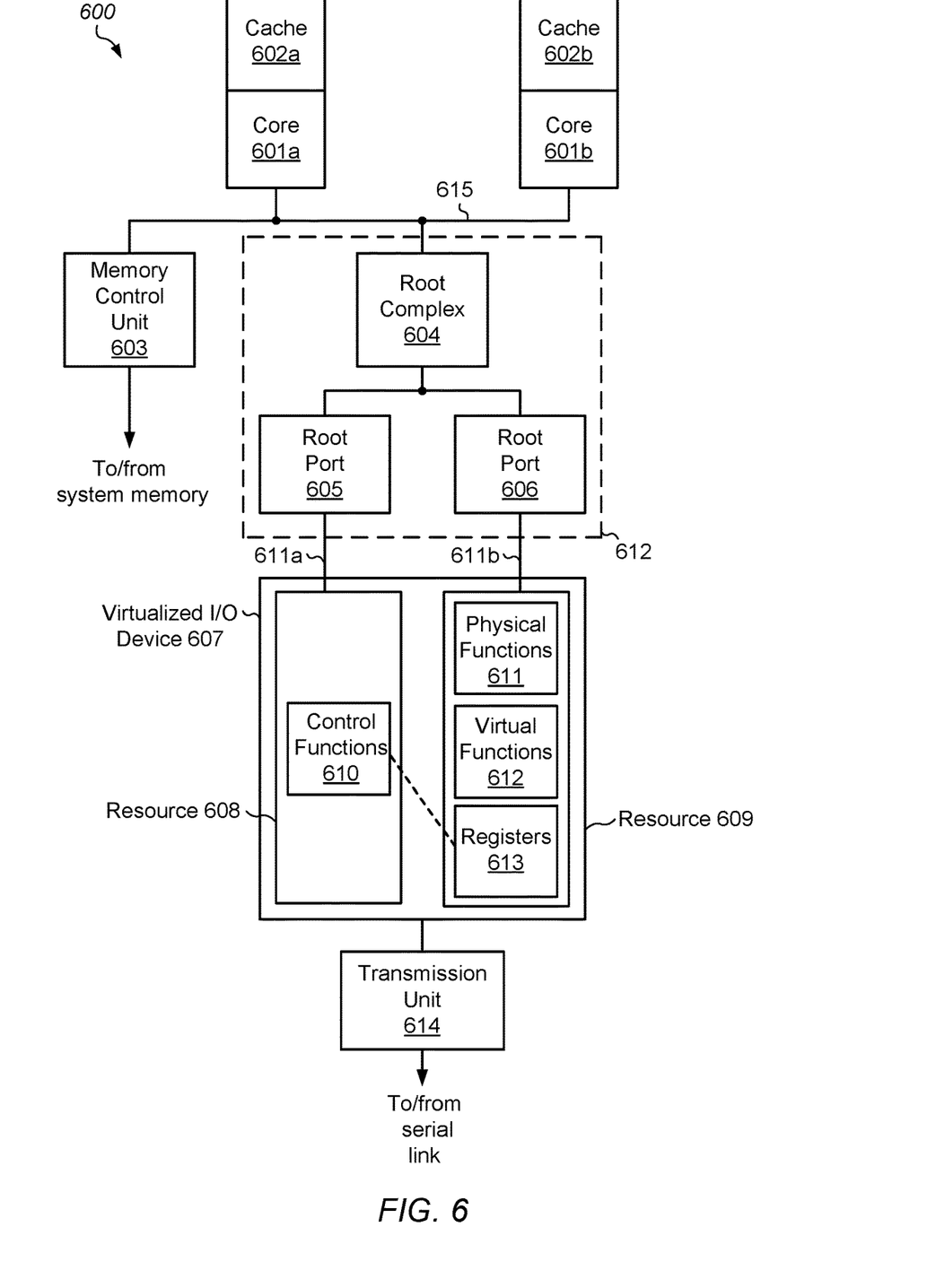
FIG. 6 is a block diagram of another embodiment of an SoC.

A block diagram illustrating another embodiment of a SoC processor is shown in FIG. 6. In some embodiments, processor 600 may correspond to processors 120a-c of DCU 100 in FIG. 1. In the illustrated embodiment, processor 600 includes processor cores 601a and 601b. It is noted that although two cores are shown, in various embodiments, any suitable number of processor cores may be employed. Each of cores 601a-b is coupled to a respective one of cache partitions 602a-b. Cores 601a-b are coupled to each other and to memory control unit 603, and communication unit 612 via on-chip network 615. On-chip network 615 may be a point-to-point network, ring-based network, or any other suitable network configuration that allows for communication between processor cores 601a-b, memory control unit 603 and communication unit 612. In some embodiments, on-chip network 615 may include a multi-wire parallel bus, and requests and responses between the various devices may be transmitted via the multi-wire parallel bus using any suitable communication protocol.

Cores 601a-b may be configured to execute instructions and to process data according to a particular instruction set architecture (ISA). In one embodiment, cores 601a-b may be configured to implement the SPARC® V9 ISA, although in other embodiments it is contemplated that any desired ISA may be employed, such as x86, ARM, PowerPC® or MIPS®, for example. In the illustrated embodiment, each of cores 601a-b may be configured to operate independently of the others, such that all cores 601a-b may execute in parallel. Additionally, in some embodiments each of cores 601a-b may be configured to execute multiple execution threads (or simply "threads") concurrently, where a given thread may include a set of instructions that may execute independently of instructions from another thread.

Cache memory partitions 602a-b may, in various embodiments, collectively form a level 3 (L3) cache memory for processor 600. The multiple cache memory partitions need to maintain coherency with respect to each other. Cache memory partitions 602a-h may, in various embodiments, implement one of numerous coherency protocols, such as, e.g., MOESI, MESI, or any suitable cache coherency protocol.

Each of cache memory partitions 602a-b may be configured to cache instructions and data for use by cores 601a-b. In the illustrated embodiment, each of cache memory partitions 602a-b may be separately addressable and independently accessed, may concurrently return data to a respective core of cores 601a-b. In some embodiments, each individual cache memory partition may be implemented using set-associative or direct-mapped techniques.

Memory control unit 603 may be configured to manage the transfer of data between cache partitions 602a-b and system memory in response to fill requests and data evictions. Memory control unit 603 may be configured to interface to any suitable type of system memory, such as described above in reference to FIG. 1. In some embodiments, memory control unit 603 may be configured to support interfacing to multiple different types of system memory.

Communication unit 612 includes a PCIe Root Complex 604 and Root Ports 605 and 606, and may be configured to transfer data between cores 601a-b and other devices. It is noted that although a single Root Complex and two Root Ports are shown in the present embodiment, other embodiments may include any suitable number of Root Complexes and Root Ports. PCIe Root Complex 604 may, in various embodiments, be configured to relay requests and responses (collectively "transactions") between cores 601a-b and a device coupled to Root Ports 605 and 606. As described above in regard to FIG. 2, transactions may be formatted differently on on-chip network 615 than what the aforementioned devices are capable of receiving, PCIe Root Complex 604 may translate the transactions from the communication protocol of on-chip network 615 to a communication protocol compatible with the device coupled to Root Ports 605 and 606. It is noted that in the present embodiment, communication unit 612 includes circuit blocks specific to the PCIe communication protocol as a particular example to aid in explanation. In other embodiments, any suitable communication protocol may be employed, such as, Peripheral Component Interface (PCI) and Accelerated Graphics Port (AGP), for example.

Each of Root Ports 605 and 606 may be configured to relay control and data plane functions, respectively, associated with a translated transaction to a particular device in accordance with a particular communication protocol. In some embodiments, Root Port 605 may be configured to relay control plane accesses to a device, while Root Port 606 may be configured to relay data plane accesses to the device. In various embodiments, Root Ports 605 and 606 may transmit their respective accesses to the device using one of various communication protocols, such as the PCIe communication protocol, for example.

Root port 605 is coupled to virtualized I/O device 607 (or simply "virtualized device 607") via link 611a, and root port 606 is coupled virtualized device 607 via link 611b. Virtualized device 607 includes control functions 610, physical functions 611, virtual functions 612, and registers 613. In various embodiments, each of the aforementioned blocks may be implemented according to one of various design styles, such as using static logic gates, for example.

In some cases, virtual functions 612 may include circuits configured to perform multiple functions, each of which may be accessed by separate Guest Operation Systems (GOS) being executed by processor 600, thereby allowing the hardware resources of virtualized device 607 to be shared among multiple software resources. Transactions relayed to virtualized device 607 via virtual link 611a-b may be encoded in accordance with any suitable protocol. In various embodiments, virtualized device 607, along with cores 601a-b, cache partitions 602a-b, memory control unit 603, root complex 604, root ports 605 and 606, may be fabricated on a single integrated circuit chip. In such cases, links 611a-b may not be limited by pin count, and may employ a multi-bit (parallel) data bus for improved communication speed and reliability.

Virtualized device 607 includes resources 608 and 609. Resource 609 may be configured to implement control functions 610, while resource 609 may be configured to implement physical functions 611 and virtual functions 612. Additionally, resource 609 includes registers 613. Each virtual function included in virtual functions 612 may be mapped to separate GOSs or threads. In some embodiments, values stored in registers 613 may affect the operation of physical functions 611 and/or virtual functions 612. Registers 613 may include control registers and status registers collectively known as control status registers or CSRs. The values in the CSRs may be accessed or updated in response to execution of commands associated with control functions 610.

Physical functions 611 and virtual functions 612 (collectively "data functions") may be accessed as part of data plane functions called via software instructions running as part of an execution thread on a given processor or processor core. Such data functions are accessed through root port 606, while control plane functions are accessed through root port 605. As described below in more detail, such software instructions may be part of driver software (commonly referred to as a "device driver") for virtualized device 600. Physical functions 611 and each of the virtual functions 612 may be mapped to a particular range of addresses within the address space of a computing system. The address range claimed by a particular virtual function might be set in a corresponding register. For example, the address range claimed by a particular virtual function of virtual functions 612 may be programmed into registers 613 (also referred to herein as a "Base Address Register" or "BAR") during initialization. Since some operations performed in the virtualized device, such as, e.g., reporting I/O link errors or managing transaction-processing resources shared by all virtual functions, may be executed by a version or operating instance of the device driver that comprehends all of the virtual functions, it is desirable to maintain a distinction between physical functions 611 and virtual functions 612.

Resources 608 and 609 may be implemented according to one of various design styles. For example, resources 608 and 609 may be implemented using a dedicated sequential logic circuit or state machine. Alternatively, a general-purpose processor configured to execute software instructions may be used to implement either of resources 608 and 609. Although two hardware resources are depicted in the embodiment illustrated in FIG. 6, it is noted that, in some embodiments, any suitable number of hardware resources, including a single hardware resources, may be employed in a virtualized device.

Virtualized device 607 is further coupled to transmission unit 614. In various embodiments, transmission unit 614 may implement one or more network adaptor functions allowing virtualized device 607 access to external device via a high-speed serial data link. For example, the transmission unit 614 may implement ENet, InfiniBand, or other suitable communication protocol.

It is noted that the embodiment depicted in FIG. 6 is merely an example. In other embodiments, different circuit blocks and different arrangements of circuit blocks may be employed.

Figure 7:
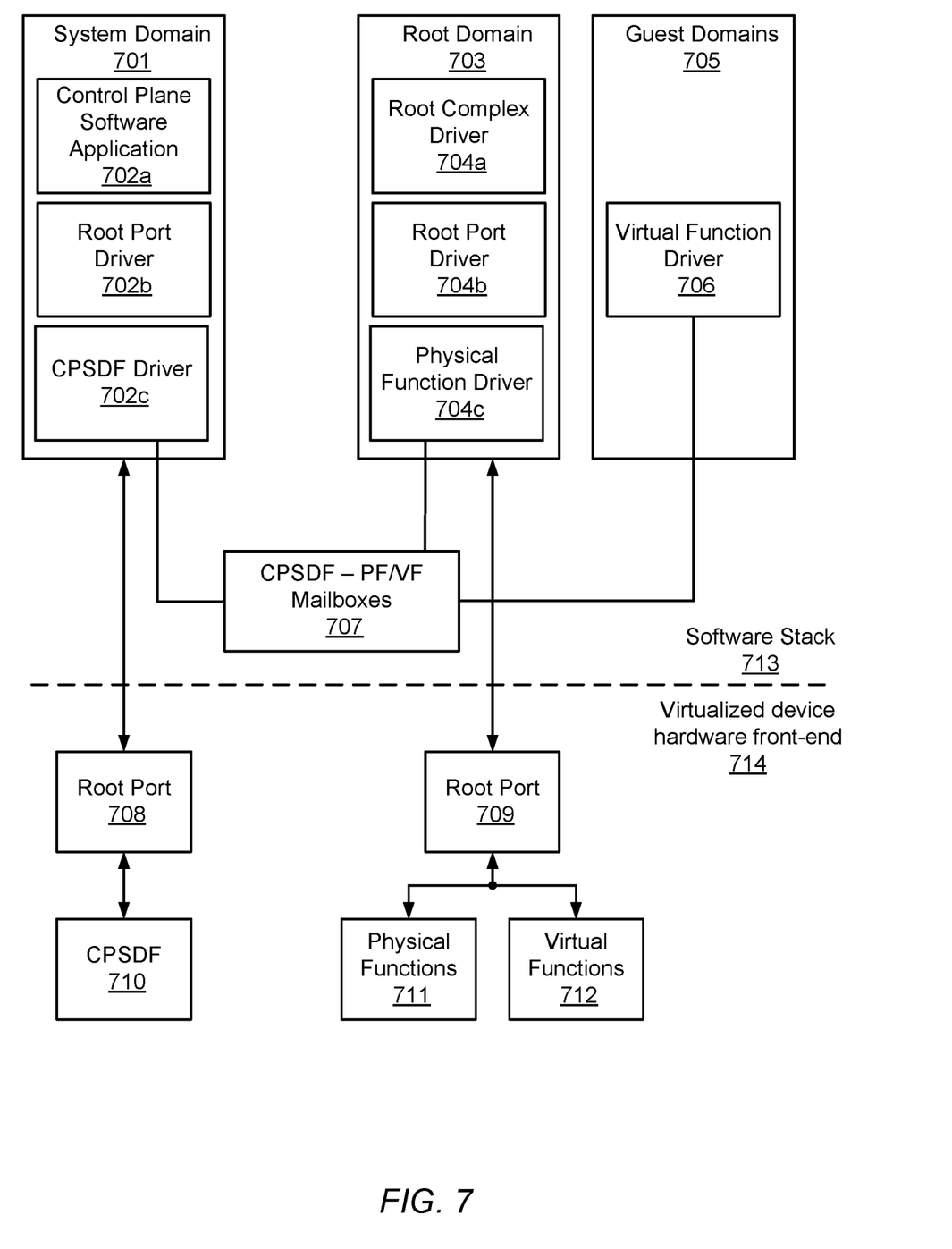
FIG. 7 is a block diagram of a software architecture for using multiple root ports to access control and data plane functions of a virtualized device.

A software architecture for use with the embodiment of FIG. 6 is illustrated in FIG. 7. In the illustrated embodiment, software stack 713 includes system domain 701, root domain 703, guest domains 705, and control plane system domain function (CPSDF)-PF/VF mailboxes 707. Virtualized device hardware front end 714 includes root ports 708 and 709, control plane system domain function (CPSDF) 710, physical functions 711, and virtual functions 712. In various embodiments, root ports 708 and 709 may correspond to root ports 605 and 606, respectively. Additionally, CPSDF 710 may correspond to control functions 610, and physical functions 711 and virtual functions 712 may correspond to physical functions 611 and virtual functions 612, respectively. It is noted that, CPSDF may execute in a different operating system type (e.g., Windows, Linux, Unix, etc.) than the root domain and guest domains, depending on the software architecture for the system and software development infrastructure.

System domain 701 runs control plane software application 702a to handle management of and housekeeping functions. Additionally, system domain 701 runs root port driver 702b for Root Port 708, and CPSDF driver 702c.

Root domain 703 runs Root Complex driver 704a, which oversees both Root Port driver 702b and Root Port driver 704b using a mailbox or other implementation-specific implementation. Root domain 703 also runs Root Port driver 704b for Root Port 709, and physical function driver 704b. In various embodiments, physical function driver 704 may conform to the PCIe communication protocol.

Guest domains 705 run virtual function driver 706. Although a single guest domain is depicted, in other embodiments, multiple guest domains may be included, each of which may run virtual function drivers. In such cases, the individual instances of the virtual function drivers may operate independently of each other. In various embodiments, virtual function driver 706 may conform to the PCIe communication protocol.

Virtual function driver 706, along with physical function driver 704c, may communicate with CPDSF driver 702 using CPSDF-PF/VF mailboxes 707, which may be located in system memory. The drivers may also communicate using interrupts delivered through a PCIe function message signal interrupt (MSI) or extended MSI (MSI-X) capability. For example, there may be a particular class of globally-visible asynchronous errors or events related to activity on links to an I/O device, such as, e.g., virtualized device 607, that result in CPSDF driver 702c informing physical function driver 704c and other virtual function driver instances. Such communication may be performed using an interrupt mechanism included in CPSDF-PF/VF mailboxes 707. In other cases, physical function driver 704c or virtual function driver 706 may receive a packet or detect an error that cannot be processed without the aid of the control plane software. In such cases, physical function driver 704c or virtual function driver 706 may use CPSDF-PF/VF mailboxes 707 to inform CPSDF driver 702c of the need for assistance, and provide details such that CPSDF driver 702 may take appropriate action.

In various embodiments, system domain 701 may be running in a different operating system than the operating system under which root domain 703 and guest domains 705 are running. Due to differences in development environment, geographic locations and team skillsets, software language features, and project schedule priorities, it may be common to have different operating systems running varied tasks in a computing system that employs virtualization.

It is noted that the embodiment depicted in the block diagram of FIG. 7 is merely an example. In other embodiments, different software domains, and different arrangements of software domains may be employed.

Figure 8:
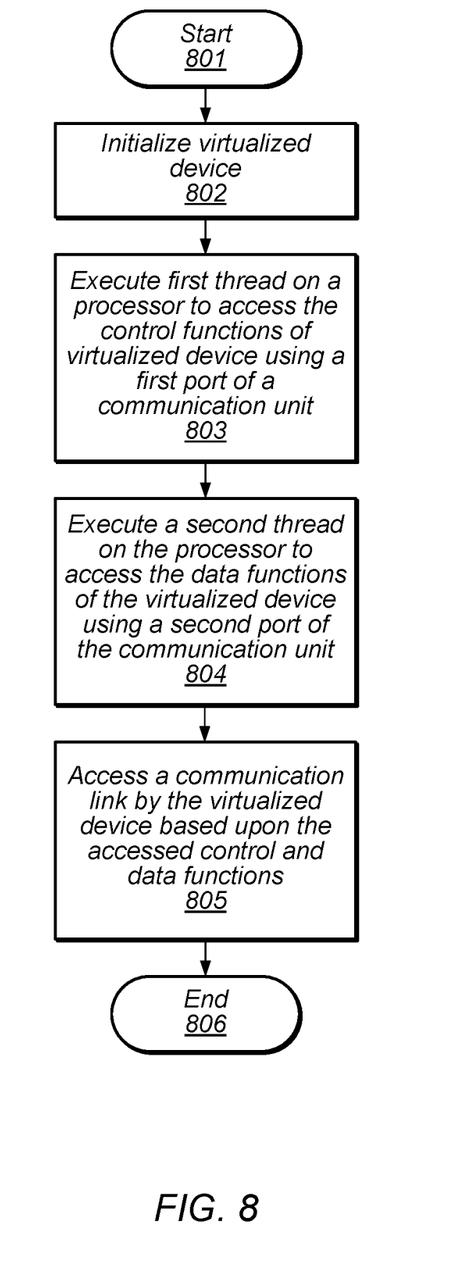
FIG. 8 illustrates a flow diagram depicting an embodiment of a method for accessing control and data plane functions of a virtualized device.

Turning to FIG. 8, a flow diagram depicting an embodiment of a method for accessing control and data plane functions in a virtualized device is illustrated. Referring collectively to the embodiment of FIG. 6, and the flow diagram of FIG. 8, the method begins in block 801.

Virtualized I/O device 607 may then be initialized (block 802). In some embodiments, during a boot procedure performed by a computing system, CSRs or other registers such as, e.g., registers 613, may be programmed with predetermined values. The predetermined values may, in some embodiments, correspond to address locations or ranges mapped to an I/O subsystem of the computing system. The virtualized device may be fabricated as part an integrated circuit that includes multiple multi-thread processor cores as well as other circuit blocks, collectively forming an SoC.

Either of cores 601a-b may then execute a first thread to access control functions 610 in virtualized I/O device 607 (block 803). In various embodiments, the first thread may include multiple instructions for setup or monitoring of virtualized I/O device 607. Upon executing such instructions, a particular one of cores 601a-b may transmit data to communication unit 612 via on-chip network 615 indicative of the control function access request. Communication unit 612 may then relay the access request to control functions 610 of virtualized I/O device 607 via root complex 604 and root port 605.

Either of cores 601a-b may then execute a second thread of access physical functions 611 and virtual functions 612 (collectively "data functions") in virtualized I/O device 607 (block 804). The second thread may, in various embodiments, include multiple instructions for managing the movement of user payload data through virtualized I/O device 607. In some cases, the multiple instructions may be included in a device driver associated with virtualized I/O device 607.

In response to executing the aforementioned instructions, a particular one of cores 601 a-b may transmit data, indicative of the request to access the data functions, to communication unit 612 via on-chip network 615. Communication unit 612 may then relay the request to access the data functions to physical functions 611 and virtual functions 612 via root complex 604 and root port 606. By routing control function request and data function requests through different root ports, checks on access requests performed by the Hypervisor layer for security purposes may be simplified.

Based on the access control and data functions, virtualized I/O device 607 may then access a communication link via transmission unit 614 (block 805). In various embodiments, transmission unit 614 may implement one or more network adaptor functions allowing virtualized I/O device 607 access to an external device via a high-speed serial data link. For example, the transmission unit 614 may implement Ethernet, InfiniBand, or other suitable communication protocol. The method may then conclude in block 806.

It is noted that the method depicted in the flow diagram of FIG. 8 is only an example. In other embodiments, different operations and different orders or operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a device including one or more hardware resources shared between one or more guest operating systems, wherein access to the one or more hardware resources is managed by one or more control functions associated with the device, and wherein the device is configured to receive and relay data payloads according to one or more data functions associated with the device;
a processor configured to:
generate a first request to access the one or more control functions associated with the device, in response to execution of a first execution thread of a plurality of execution threads; and
generate a second request to access the one or more data functions in response to execution of a second execution thread of the plurality of execution threads, wherein the processor is further configured to execute second execution thread independently of the first execution thread; and
a communication circuit coupled to the processor on a common integrated circuit chip, wherein the communication circuit includes a first hardware port and a second hardware port, and wherein the communication circuit is configured to:
in response to receiving the first request via an on-chip communication protocol:
translate the first request from the on-chip communication protocol to a different communication protocol compatible with the device; and
send, to the device using the first hardware port and the different communication protocol, first data indicative of the first request; and
in response to receiving the second request via the on-chip communication protocol:
translate the second request from the on-chip communication protocol to the different communication protocol; and
send, to the device using the second hardware port and the different communication protocol, second data indicative of the second request.

2. The apparatus of claim 1, wherein the device is coupled to a communication link employing a given communication protocol, and wherein the device is further configured to access the communication link based on the one or more control functions associated with the device and the one or more data functions.

3. The apparatus of claim 1, wherein the device is further configured to communicate one or more capabilities to the processor during an initialization procedure using the different communication protocol.

4. The apparatus of claim 1, wherein the device includes a plurality of registers, and wherein the first request includes a particular request to access at least one register of the plurality of registers.

5. The apparatus of claim 1, wherein the different communication protocol includes a Peripheral Component Interface Express (PCIe) communication protocol.

6. The apparatus of claim 1, wherein the device is further configured to detect one or more events, and wherein the processor is further configured to store a particular data value in a memory location in response to a detection of the one or more events by a driver executing in the second execution thread.

7. A method, comprising:
generating, a first request to access one or more control functions to manage access to hardware resources included in a device by one or more guest operating systems in a computing system by a particular processor of a plurality of processors executing a first execution thread of a plurality of execution threads, wherein the device is configured to receive and relay data payloads according to one or more data functions associated with the device;
generating, a second request to access the one or more data functions by the particular processor of the plurality of processors executing a second execution thread of the plurality of execution threads independently of the first execution thread;
receiving, by a communication circuit, the first request and the second request via an on-chip communication, wherein the communication circuit is coupled to the particular processor on a common integrated circuit chip, and wherein the communication circuit includes a first hardware port and a second hardware port;
translating, by the communication circuit, the first request and the second request from a on-chip communication protocol to a different communication protocol compatible with the device, wherein the different communication protocol includes a Peripheral Component Interface Express (PCIe) protocol;
sending, by the communication circuit using the different communication protocol and the first hardware port, first data indicative of the first request to the device;
sending, by the communication circuit, using the different communication protocol and the second hardware port, second data indicative of the second request; and
accessing a communication link coupled the device using the one or more control functions included in the device and the one or more data functions of the device.

8. The method of claim 7, further comprising communicating, by the device, one or more capabilities to the particular processor of the plurality of processors during an initialization procedure using the different communication protocol.

9. The method of claim 7, wherein the device further includes a plurality of registers, and wherein the first request to access the one or more control functions includes accessing at least one register of the plurality of registers.

10. The method of claim 7, wherein the plurality of processors, the communication circuit, and the device are included the common integrated circuit chip.

11. A system, comprising:
- a plurality of processors configured to independently execute a plurality of execution threads, wherein a first processor of the plurality of processors is configured to execute a first execution thread of the plurality of execution threads included in a first guest operating system instance, and wherein a second processor of the plurality of processors is configured to execute a second execution thread of the plurality of execution threads included in a second guest operating system instance;
- a first device configured to perform a plurality of control functions and a plurality of virtual functions, wherein the first device includes at least one hardware resource configured to be shared by two or more virtual functions of the plurality of virtual functions;
- a second device; and
- a communication unit, located on a common integrated circuit chip with the plurality of processors, including a first port and a second port, wherein the first port is coupled to the first device via a first link and the second port is coupled to the second device via a second link, wherein the communication unit is configured to:
  - receive, via an on-chip communication protocol associated with the common integrated circuit chip, a first request generated by an execution of at least a first instruction included in the first execution thread, wherein each instruction included in the first execution thread controls at least one control function of the plurality of commands functions;
  - receive, via the on-chip communication protocol, a second request generated by an execution of at least a second instruction included in the second execution thread, wherein each instruction, included in the second execution thread, controls a first virtual function of the plurality of virtual functions;
  - translate the first request and the second request from the on-chip communication protocol to a different communication protocol;
  - transmit, using the first port, at least a first command associated with the first request via the first link using the different communication protocol to the first device; and
  - transmit, using the second port, at least a second command associated with the second request via the first link using the different communication protocol.

12. The system of claim 11, wherein the communication unit is further configured to transmit at least a third command associated with a third request via the first link using the different communication protocol to the first device, wherein the third request is generated in response to an execution of at least a third software instruction included in the second execution thread.

13. The system of claim 11, wherein the communication unit is configured to transmit at least a fourth command associated with a fourth request via the second link using the different communication protocol to the second device, wherein the fourth request is generated in response to an execution of at least a third instruction included in the second execution thread.

14. The system of claim 13, wherein the different communication protocol includes a Peripheral Component Interface Express (PCIe).

15. The system of claim 11, wherein the first device is coupled to a transmission unit, wherein the transmission unit is configured to send and receive data packets via a serial data link.

16. The system of claim 11, wherein each of the plurality of processors, the communication unit, and the first device are included in the common integrated circuit chip.

* * * * *